United States Patent
Stewart

(10) Patent No.: US 9,146,545 B2
(45) Date of Patent: Sep. 29, 2015

(54) MULTIVARIABLE CONTROL SYSTEM FOR SETPOINT DESIGN

(71) Applicant: Honeywell International Inc., Morristown, NJ (US)

(72) Inventor: Gregory E. Stewart, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 478 days.

(21) Appl. No.: 13/686,800

(22) Filed: Nov. 27, 2012

(65) Prior Publication Data

US 2014/0148928 A1    May 29, 2014

(51) Int. Cl.
| | |
|---|---|
| *G05B 13/02* | (2006.01) |
| *B60W 10/06* | (2006.01) |
| *F02D 41/02* | (2006.01) |
| *F02D 41/24* | (2006.01) |
| *F02D 41/14* | (2006.01) |
| *F02D 41/00* | (2006.01) |

(52) U.S. Cl.
CPC ............... *G05B 13/02* (2013.01); *B60W 10/06* (2013.01); *F02D 41/0235* (2013.01); *F02D 41/2409* (2013.01); *F02D 41/2432* (2013.01); *F02D 41/0007* (2013.01); *F02D 41/0055* (2013.01); *F02D 41/1404* (2013.01); *F02D 41/1405* (2013.01); *F02D 41/1406* (2013.01); *F02D 2041/1433* (2013.01); *F02D 2200/0406* (2013.01); *F02D 2200/0414* (2013.01); *F02D 2200/08* (2013.01); *F02D 2200/602* (2013.01)

(58) Field of Classification Search
CPC . G05B 13/02; F02D 41/2432; F02D 41/2409; F02D 41/0235; F02D 41/1406; F02D 41/1405; F02D 41/1404; F02D 2200/0406; F02D 2200/602; F02D 2041/1433; F02D 41/0055; F02D 2200/08; F02D 41/0007; F02D 2200/0414; B60W 10/06
See application file for complete search history.

(56) References Cited

U.S. PATENT DOCUMENTS

| | | | | |
|---|---|---|---|---|
| 6,230,501 | B1* | 5/2001 | Bailey et al. | 62/51.1 |
| 6,349,700 | B1* | 2/2002 | Buckland et al. | 123/352 |
| 6,790,034 | B1* | 9/2004 | Kearns et al. | 432/37 |
| 7,155,334 | B1 | 12/2006 | Stewart et al. | |
| 7,165,399 | B2 | 1/2007 | Stewart | |
| 7,275,374 | B2 | 10/2007 | Stewart et al. | |

(Continued)

OTHER PUBLICATIONS

Jankov, Kristian. "Beitrag zur automatisierten Steuerkennfeld-Applikation bei Fahrzeug-Dieselmotoren," 164 pages, Aug. 28, 2008. Retrieved from the Internet: http://opus.kobv.de/tuberlin/volltexte/2008/1972/pdf/jankov_kristian.pdf.

(Continued)

*Primary Examiner* — Ramesh Patel
(74) *Attorney, Agent, or Firm* — Seager Tufte & Wickhem LLP

(57) ABSTRACT

A system and approach for development of setpoints for a controller of an engine or powertrain. The controller may be parametrized as a function of setpoints to provide performance variables that are considered acceptable by a user or operator for normal operating conditions of the engine or powertrain. With each iteration of the setpoints, the controller may be reconfigured to provide more stable and dynamically performant control of the engine or powertrain. The present system and approach may automate a previously labor intensive approach for designing setpoints for the controller.

20 Claims, 4 Drawing Sheets

(56) References Cited

U.S. PATENT DOCUMENTS

| | | | |
|---|---|---|---|
| 7,328,577 B2 * | 2/2008 | Stewart et al. | 60/605.2 |
| 7,389,773 B2 | 6/2008 | Stewart et al. | |
| 7,415,389 B2 * | 8/2008 | Stewart et al. | 702/185 |
| 7,467,614 B2 | 12/2008 | Stewart et al. | |
| 7,469,177 B2 * | 12/2008 | Samad et al. | 701/54 |
| 7,515,975 B2 | 4/2009 | Stewart | |
| 7,577,483 B2 * | 8/2009 | Fan et al. | 700/29 |
| 7,591,135 B2 * | 9/2009 | Stewart | 60/600 |
| 7,603,185 B2 * | 10/2009 | Stewart et al. | 700/32 |
| 7,613,561 B1 * | 11/2009 | Stewart et al. | 701/109 |
| 7,752,840 B2 | 7/2010 | Stewart | |
| 7,810,313 B2 * | 10/2010 | Stewart et al. | 60/274 |
| 7,878,178 B2 | 2/2011 | Stewart et al. | |
| 7,958,730 B2 | 6/2011 | Stewart | |
| 7,996,140 B2 * | 8/2011 | Stewart et al. | 701/102 |
| 8,060,290 B2 | 11/2011 | Stewart et al. | |
| 8,078,291 B2 | 12/2011 | Pekar et al. | |
| 8,109,255 B2 | 2/2012 | Stewart et al. | |
| 8,145,329 B2 * | 3/2012 | Pekar et al. | 700/45 |
| 8,151,626 B2 | 4/2012 | Krafthefer et al. | |
| 8,265,854 B2 * | 9/2012 | Stewart et al. | 701/102 |
| 2004/0210373 A1 * | 10/2004 | Graf et al. | 701/54 |
| 2009/0158706 A1 * | 6/2009 | Sun | 60/274 |
| 2009/0249521 A1 * | 10/2009 | Dazzi et al. | 850/33 |
| 2010/0234523 A1 | 9/2010 | Uozumi et al. | |
| 2011/0212845 A1 | 9/2011 | Drygin et al. | |
| 2011/0236393 A1 | 9/2011 | Hwang et al. | |
| 2011/0288828 A1 | 11/2011 | Pachner et al. | |
| 2011/0288846 A1 | 11/2011 | Kihas | |
| 2011/0301723 A1 | 12/2011 | Pekar et al. | |
| 2012/0016647 A1 | 1/2012 | Germann et al. | |
| 2012/0059782 A1 | 3/2012 | Pekar et al. | |
| 2012/0107921 A1 * | 5/2012 | Willson et al. | 435/286.5 |
| 2013/0006494 A1 * | 1/2013 | Petrovic | 701/102 |

OTHER PUBLICATIONS

International Search Report for Corresponding Application EP13191442 dated Apr. 14, 2014.

Allain et al., "Next Generation Diesel Engine Control," Detroit Diesel Corporation, 19 pages, 2012.

* cited by examiner

MULTIVARIABLE CONTROL SYSTEM FOR SETPOINT DESIGN

BACKGROUND

The present disclosure pertains to engines and/or aftertreatment systems, particularly to a control of engines. More particularly, the disclosure pertains to performance improvement of engines and/or aftertreatment systems.

SUMMARY

The disclosure reveals a system and approach for development of setpoints for a controller of an engine or powertrain and/or an aftertreatment system. The controller may be parametrized as a function of setpoints to provide performance variables that are considered acceptable by a user or operator for normal operating conditions of the engine or powertrain and/or aftertreatment systems. With each iteration of the setpoints, the controller may be reconfigured to provide more stable and dynamically performant control of the engine or powertrain. The present system and approach may automate a previously labor intensive approach for designing setpoints for the controller.

DESCRIPTION

The present system and approach, as described herein and/or shown in the Figures, may incorporate one or more processors, computers, controllers, user interfaces, wireless and/or or wire connections, and/or the like, wherever desired.

Transportation original equipment manufacturers (OEMs) may spend a large amount of time and money on a labor intensive process of designing setpoints for their powertrain controllers. A powertrain may incorporate an engine and, in some instances, an exhaust gas aftertreatment mechanism. The powertrain may also incorporate a drivetrain and, in some setups, a vehicle associated with the drivetrain. Any reference to an engine, powertrain or aftertreatment system herein, may be regarded as a reference to any other or all of these components.

One version of the present approach may leverage a powertrain controller to assist in the development of setpoints. Such may be parametrized as a function of the setpoints and thus with each iteration of a change in setpoints. The controller may be automatically re-issued, thus automating a painstaking manual step for the OEMs. Another version of the present approach may be a practical way for providing a user with information about how best to modify setpoints for a powertrain controller.

Extensive engine mapping is typically performed over the course of about three to six months to obtain data. Other time periods may be implemented. From the data, an OEM may construct a coarse map of the actuator positions that will deliver an optimal tradeoff of performance variables (SFC, emissions, and so forth) in a steady-state. Then a control design phase may start. A steady-state may be defined as the state arrived at when holding the engine speed, injected fuel quantity, and various actuator signals at a constant value for a period of time sufficient for the engine and aftertreatment system's outputs to reach constant values.

An output of the above step may be used to initialize the maps of setpoints for the controller. Control calibration may include refining and usually manually changing the setpoint maps such that the performance variables will be acceptable under normal driving conditions and pre-specified certification drive cycles. Each iteration of refining and changing setpoint maps may involve manual trial and error and/or a retuning of the underlying dynamic controller. Once complete, the engine and calibrated control may be transferred to the next phase, such as certification.

The following approach may be less labor intensive and iterative. Extensive engine mapping may be performed over the course of about three to six months. Other time period may be utilized. From the data of the engine mapping, the OEM may construct a coarse map of actuator positions that will deliver an optimal tradeoff of performance variables (SFC, emissions, and so forth) in a steady-state.

Figure 1:
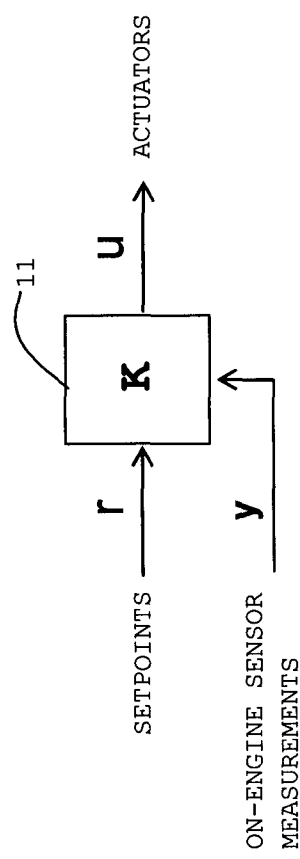
FIG. 1 is a diagram of a controller of the present system having inputs of setpoints and sensor signals and an output for actuator signals.
Figure 2:
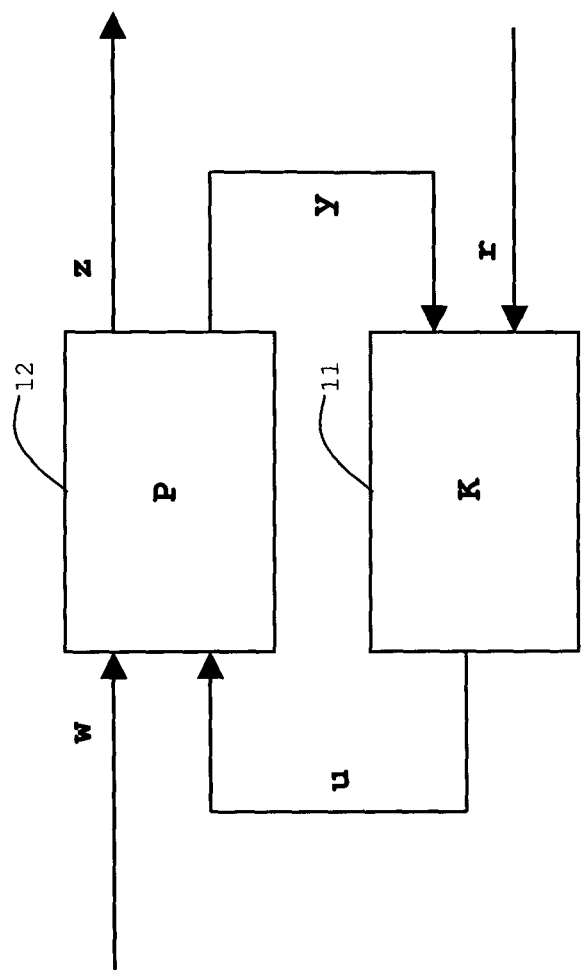
FIG. 2 is a diagram of the system having engine and controller subsystems.

Then a control design phase may start. An output of the above step may be used to initialize maps of setpoints for a multi-variable controller that can relate to measured feedback or sensor variables, performance or quality variables, and so forth. The multi-variable controller may be automatically calibrated towards the engine and the specified setpoints r in y. "r" may represent setpoints to a controller 11 as shown in a diagram of FIG. 1. "y" may represent on-engine sensor measurements such as boost pressure, compressor flow, and so forth. "u" may represent signals from controller 11 to operate actuators such as those of VGT vanes, EGR valve, urea dosing, and so forth, on an engine or powertrain. FIG. 2 is a diagram of controller 11 and an engine or powertrain 12. "w" may represent exogenous inputs such as speed, fuel, ambient conditions, and so forth. These inputs may be measured. The outputs such as the performance and quality variables "z" are not necessarily measured but may inferred, approximated by modeling, estimated by trials, calculated with algorithms, and other ways.

With each iteration of the setpoints in y, the controller may be automatically and quickly reconfigured to provide stable and dynamically performant control. Once the iterations are considered complete, the engine and calibrated control may be transferred to the next phase, which may be certification.

Another version of powertrain setpoint design may be used. Again, there may be extensive engine mapping performed over a period of about three to six months. Other time periods may be used. From mapping data, an OEM may construct a coarse map of the actuator positions that will deliver an optimal tradeoff of performance variables (SFC, emissions, and so forth) in the steady-state. Then the control design phase may start. The output of the above step may be used to initialize the maps of setpoints for the controller.

The multi-variable controller may be automatically calibrated towards the engine and the specified setpoints in r. A closed-loop "design of experiment" may be run, in which setpoints (r) are perturbed such that information is obtained about the resulting performance or quality variables (z). The information may be recorded. A calculation may be run to provide a user with one or more recommended changes to the setpoints in r. With each iteration of the setpoints in r, the controller may be automatically and quickly reconfigured to provide stable and dynamically performant control. Once this phase is completed, the engine and calibrated control may be transferred to the next phase, such as certification.

Figure 3:
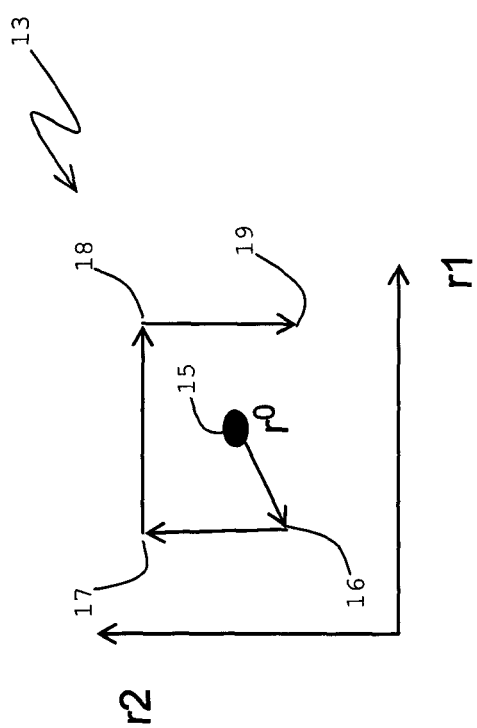
FIG. 3 is a diagram of graph showing a series of steps in the setpoints where at each position of the setpoints, a closed-loop of the controller may come to an equilibrium.
Figure 4:
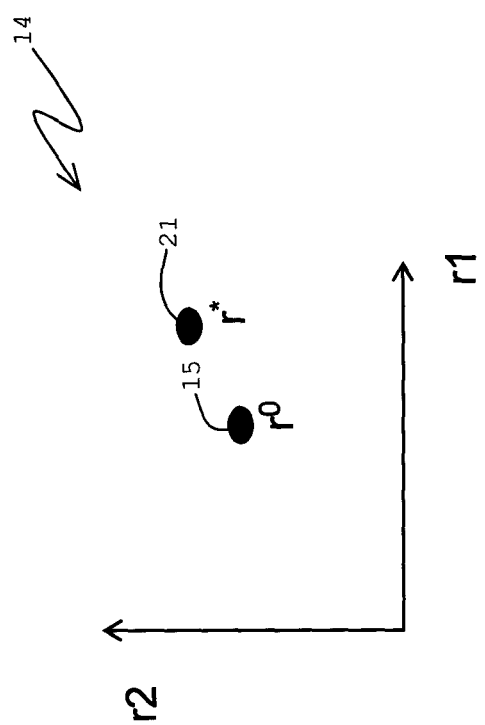
FIG. 4 is a diagram of a graph like the graph of FIG. 3 showing a newly derived setpoint relative to a starting or nominal setpoint.

An algorithm for a design phase involving setpoint adjustments may be noted. To begin, a control oriented model of an engine (or an engine plus an aftertreatment system) may be constructed. A design feedback controller may be parameterized as a function of setpoints r. The measured sensor variables may usually be things like pressure (e.g., MAP), flows (e.g., MAF), compositions (e.g., O2, NOx), and possibly temperatures on the engine. A starting multivariable setpoint "$r^0$" may be regarded as a nominal setpoint 15, as shown in the graphs 13 and 14 of r2 versus r1 in FIGS. 3 and 4, respectively.

A user may observe engine performance in terms of quality or performance variables "z". Often, z may incorporate an array of emissions (e.g., NOx, PM, NOx, NH3, PM, exhaust temperature (Texh), and/or exhaust mass (mexh) and/or other general emissions), and specific fuel consumption (viz., SFC), in that for example z={NOx, PM, SFC}.

Enabled by the feedback controller, the user may then introduce a series of steps in the setpoints "r". At each new position, for instance, 16, 17, 18 and 19 in FIG. 3, of setpoints r; the user may allow a closed-loop of the controller and engine (or engine and aftertreatment system) come to an equilibrium. Then the user may record the values of the quality variables z. Using this information of the recorded values, the user may then build and calibrate a model which mathematically expresses the quality variables as a function of the setpoints, z=f(r). The model f( ) may be a physics based (grey box) or a numerical (black box) model of the engine or aftertreatment system.

Next, the user may want to change the setpoints r to impact the quality variables z. Here with the model z=f(r) for a general set of n quality variables, there may be at least two options. One may incorporate tuning the weights in an optimization function, $$r^* = \operatorname*{argmin}_{r}(\|\rho_1 f_1(r)\| + \ldots + \|\rho_n f_n(r)\|).$$

Another option, may incorporate changing the targets in an optimization function, $$r^* = \operatorname*{argmin}_{r}(\|z_1^{target} - f_1(r)\| + \ldots + \|z_n^{target} - f_n(r)\|).$$

Then the user may implement the newly derived setpoints r*, as shown as item 21 in graph 14 relative to starting setpoint "$r^0$" or nominal setpoint 15, into controller (K) 11, and observe the values of the quality variables z. The process or approach may be repeated as often as needed until the user is satisfied with the quality variables z.

To recap, a system for setpoint determination, may incorporate an engine and/or aftertreatment system with a first input having exogenous signals and a first output having performance variables, and a controller having a second input having measured feedback variables from the engine, a third input having setpoints, and a second output having actuator signals for the engine. A map may be constructed of actuator positions that deliver certain performance variables from data of a mapping of the engine over a predetermined period of time. Setpoints in r for the controller may be initialized from the map. The controller may be calibrated towards the engine and/or an iteration of setpoints in r. y may incorporate measured feedback variables from the engine.

With each iteration of setpoints, the controller may be reconfigured to provide stable and dynamically performant control of the engine. A reconfiguration of the controller may incorporate a semi-automatic generation of the controller in which a change in setpoints is followed by a re-linearization of an engine model, followed by an automatic redesign of a controller as a function of a linearized model.

The setpoints may be changed until the performance variables are deemed acceptable by a user or operator for normal operating conditions of the engine. The controller may be calibrated towards the engine and/or an iteration of setpoints in r, a calibrated control of the engine can be considered as complete and then a transfer to a next phase, such as certification, can occur.

An iteration of setpoints may incorporate the setpoints being varied and resulting in corresponding changes of the performance variables, and a calculation being derived from variations of the setpoints and corresponding changes of the performance variables. The calculation may result in a recommended change to the setpoints.

Exogenous signals may incorporate one or more items of engine speed, fueling rate, ambient temperature, ambient air pressure, pedal position, and/or pedal change rate. Measured feedback variables may incorporate one or more on-engine measurements of compressor boost pressure, compressor flow, MAP, MAF, EGR flow, MAT, temperatures, emissions, lambda sensor indications, exhaust manifold pressure, total engine air flow, turbocharger speed, engine sensors, emission sensors, after-treatment sensors, NOx concentration, and/or exhaust gas temperature. Actuator signals may incorporate one or more items of variable geometry turbine (VGT) vanes, high pressure or low pressure exhaust gas recirculation (EGR) valves, throttle valves, fuel injection specifications, start of injection (SOI) timing variable valve actuation (VVA), wastegate valve, urea dosing, and/or post-injection of fuel for DPF regeneration.

Performance variables may incorporate one or more items pertaining to specific fuel consumption, general emissions, NOx, NH3, PM, HC, and/or CO2. Setpoints may incorporate one or more items pertaining to measured feedback variables, MAP, MAF, EGR flow, air-fuel ratio, pressures, flows, temperatures, NOx, upper and lower limits of actuator positions, a limit for lambda indication, a limit for turbocharger speed, and/or so forth.

An approach for determining setpoints for an engine system, may incorporate building a control-oriented model of an engine system, designing a feedback controller parametrized as a function of setpoints, designating a starting setpoint as a nominal setpoint, observing performance of the engine in terms of quality variables, introducing a series of steps in the setpoints as enabled by the feedback controller, allowing a closed loop of the feedback controller and engine and/or aftertreatment system to come to equilibrium at each position of setpoints, recording values of the quality variables at each position of setpoints, building and calibrating a model from the values to express the quality variables as a function of setpoints, and changing the setpoints to affect the quality variables.

The quality variables may incorporate one or more items of specific fuel consumption and/or an array of emissions. The setpoints may pertain to one or more items incorporating measured sensor variables.

The approach may further incorporate observing engine performance in view of the quality variables. The engine system may incorporate an engine and an after-treatment subsystem.

In the approach, n=a number of quality variables, r=setpoints, z=quality variables, and r*=newer derived setpoints.

$$r^* = \underset{r}{\mathrm{argmin}}(\|\rho_1 f_1(r)\| + \ldots + \|\rho_n f_n(r)\|),$$

which may be an optimization formula. The weights ($\rho$) may be tuned.

In a variant of the approach, n=a number of quality variables, r=setpoints, z=quality variables, $z^{target}$=user-specified desired quality variables, and r*=newer derived setpoints.

$$r^* = \underset{r}{\mathrm{argmin}}(\|z_1^{target} - f_1(r)\| + \ldots + \|z_n^{target} - f_n(r)\|),$$

which may be an optimization formula. The targets may be changed to affect setpoints.

The approach may further incorporate implementing newly derived setpoints into a controller of the engine, observing values of the quality variables, and repeating steps until the values of the quality variables are acceptable to a user or operator of the engine system. The steps may incorporate the following where, n=a number of quality variables, r=setpoints, z=quality variables, and r*=newer derived setpoints.

$$r^* = \underset{r}{\mathrm{argmin}}(\|\rho_1 f_1(r)\| + \ldots + \|\rho_n f_n(r)\|),$$

which may be an optimization formula. The weights ($\rho$) may be tuned, newly derived setpoints may be implemented into a controller of the engine, and values of the quality variables may be observed, and the steps may be repeated until the values of the quality variables are acceptable to a user or operator of the engine system.

The approach may further incorporate implementing newly derived setpoints into a controller of the engine, observing values of the quality variables, and repeating steps herein until the values of the quality variables are acceptable to a user or operator of the engine system. The steps may incorporate the following where, n=a number of quality variables, r=setpoints, z=quality variables, $z^{target}$=user-specified desired quality variables, and r*=newer derived setpoints.

$$r^* = \underset{r}{\mathrm{argmin}}(\|z_1^{target} - f_1(r)\| + \ldots + \|z_n^{target} - f_n(r)\|),$$

which may be an optimization formula. The targets may be changed to affect setpoints, newly derived setpoints may be implemented into a controller of the engine, and values of the quality variables may be observed, and the steps may be repeated until the values of the quality variables are acceptable to a user or operator of the engine system.

A system of multivariable control for setpoint determination may incorporate an engine and/or aftertreatment system, a controller connected to the engine and/or aftertreatment system, data from mapping the engine performed over a time period, a map of actuator positions for the engine relative to performance variables constructed from the data, and one or more maps of setpoints for the controller of the engine initialized from the map. The controller may automatically be calibrated towards the engine and/or setpoints of the one or more maps, specified in measured feedback variables from the engine to the controller.

In the system, an iteration of setpoints may incorporate the setpoints being perturbed and resulting an effect on the performance variables, and a calculation incorporating information about the setpoints being perturbed and resulting the effect on the performance variables, is run to indicate one or more changes recommended for the setpoints.

With an implementation of the one or more changes recommended by an iteration of setpoints for the setpoints, the controller may be automatically reconfigured to provide a stable and dynamically performant control of the engine for the new setpoints.

The setpoints may be iterated until a predetermined level of performance is achieved by the closed-loop system. The controller may be reconfigured with each iteration of the setpoints. When the predetermined level of performance of the engine and/or aftertreatment system is achieved, a multivariable control for setpoint determination may be considered complete and a transfer to a next phase, such as certification, can occur.

The performance variables may incorporate one or more items of specific fuel consumption and/or emissions. Setpoints may be changed according to the one or more changes recommended for the setpoints until the performance variables are deemed acceptable by a user or operator for normal operating conditions of the engine.

The following patent documents may be relevant to the present system and approach. U.S. patent application Ser. No. 13/236,217, filed Sep. 19, 2011, and entitled "Coordinated Engine and Emissions Control System", and U.S. Pat. No. 8,265,854, issued Sep. 11, 2012, and entitled "Configurable Automotive Controller", are hereby incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system for setpoint determination, comprising:
an engine and/or aftertreatment system having a first input comprising exogenous signals and a first output comprising performance variables; and
a controller having a second input comprising measured feedback variables from the engine, a third input comprising setpoints, and a second output comprising actuator signals for the engine; and
wherein:
a map is constructed of actuator positions that deliver certain performance variables from data of a mapping of the engine over a predetermined period of time;
setpoints in r for the controller are initialized from the map;
the controller is calibrated towards the engine and/or an iteration of setpoints in r; and
y comprises measured feedback variables from the engine.

2. The system of claim 1, wherein with each iteration of setpoints, the controller is reconfigured to provide stable and dynamically performant control of the engine.

3. The system of claim 2, wherein a reconfiguration of the controller comprises a semi-automatic generation of the controller in which a change in setpoints is followed by a re-linearization of an engine model, followed by an automatic redesign of a controller as a function of a linearized model.

4. The system of claim 1, wherein the setpoints are changed until the performance variables are deemed acceptable by a user or operator for normal operating conditions of the engine.

5. The system of claim 1, wherein when the controller is calibrated towards the engine and/or an iteration of setpoints in r, a calibrated control of the engine can be considered as complete and then a transfer to a next phase, such as certification, can occur.

6. The system of claim 1, wherein an iteration of setpoints comprises:
the setpoints being varied and resulting in corresponding changes of the performance variables; and
a calculation being derived from variations of the setpoints and corresponding changes of the performance variables; and
wherein the calculation results in a recommended change to the setpoints.

7. The system of claim 1, wherein:
exogenous signals comprise one or more items comprising engine speed, fueling rate, ambient temperature, ambient air pressure, pedal position, and/or pedal change rate;
measured feedback variables comprise one or more on-engine measurements comprising compressor boost pressure, compressor flow, MAP, MAF, EGR flow, MAT, temperatures, emissions, lambda sensor indications, exhaust manifold pressure, total engine air flow, turbocharger speed, engine sensors, emission sensors, after-treatment sensors, NOx concentration, and/or exhaust gas temperature;
actuator signals comprise one or more items comprising variable geometry turbine (VGT) vanes, high pressure or low pressure exhaust gas recirculation (EGR) valves, throttle valves, fuel injection specifications, start of injection (SOI) timing variable valve actuation (VVA), wastegate valve, urea dosing, and/or post-injection of fuel for DPF regeneration;
performance variables comprise one or more items pertaining to specific fuel consumption, general emissions, NOx, NH3, PM, HC, and/or CO2; and
setpoints comprise one or more items pertaining to measured feedback variables, MAP, MAF, EGR flow, air-fuel ratio, pressures, flows, temperatures, NOx, upper and lower limits of actuator positions, a limit for lambda indication, a limit for turbocharger speed, and/or so forth.

8. A method for determining setpoints for an engine system, comprising:
building a control-oriented model of an engine system;
designing a feedback controller parametrized as a function of setpoints;
designating a starting setpoint as a nominal setpoint;
observing performance of the engine in terms of quality variables;
introducing a series of steps in the setpoints as enabled by the feedback controller;
allowing a closed loop of the feedback controller and engine and/or aftertreatment system to come to equilibrium at each position of setpoints, recording values of the quality variables at each position of setpoints;
building and calibrating a model from the values to express the quality variables as a function of setpoints; and
changing the setpoints to affect the quality variables; and
wherein:
the quality variables comprise one or more items comprising specific fuel consumption and/or an array of emissions; and
the setpoints pertain to one or more items comprising measured sensor variables.

9. The method of claim 8, further comprising observing engine performance in view of the quality variables.

10. The method of claim 9, wherein the engine system comprises an engine and an after-treatment subsystem.

11. The method of claim 9, wherein:
n=a number of quality variables;
r=setpoints;
z=quality variables;
r*=newer derived setpoints;

$$r^* = \underset{r}{\operatorname{argmin}}(\|\rho_1 f_1(r)\| + \ldots + \|\rho_n f_n(r)\|);$$

which is an optimization formula; and
the weights ($\rho$) are tuned.

12. The method of claim 9, wherein:
n=a number of quality variables;
r=setpoints;
z=quality variables;
$z^{target}$=user-specified desired quality variables;
r*=newer derived setpoints;

$$r^* = \underset{r}{\operatorname{argmin}}(\|z_1^{target} - f_1(r)\| + \ldots + \|z_n^{target} - f_n(r)\|),$$

which is an optimization formula; and
the targets are changed to affect setpoints.

13. The method of claim 8, further comprising:
implementing newly derived setpoints into a controller of the engine;
observing values of the quality variables; and
repeating steps of claims 8 and 11 until the values of the quality variables are acceptable to a user or operator of the engine system.

14. The method of claim 8, further comprising:
implementing newly derived setpoints into a controller of the engine;
observing values of the quality variables; and
repeating steps of claims 8 and 12 until the values of the quality variables are acceptable to a user or operator of the engine system.

15. A system of multivariable control for setpoint determination comprising:
an engine and/or aftertreatment system;
a controller connected to the engine and/or aftertreatment system;
data from mapping the engine performed over a time period;
a map of actuator positions for the engine relative to performance variables constructed from the data; and
one or more maps of setpoints for the controller of the engine initialized from the map; and wherein the controller is automatically calibrated towards the engine and/or setpoints of the one or more maps, specified in measured feedback variables from the engine to the controller.

16. The system of claim 15, wherein an iteration of setpoints comprises:

the setpoints being perturbed and resulting an effect on the performance variables; and a calculation incorporating information about the setpoints being perturbed and resulting the effect on the performance variables, is run to indicate one or more changes recommended for the setpoints.

17. The system of claim 16, wherein with an implementation of the one or more changes recommended by an iteration of setpoints for the setpoints, the controller is automatically reconfigured to provide a stable and dynamically performant control of the engine for the new setpoints.

18. The system of claim 17, wherein:

the setpoints are iterated until a predetermined level of performance is achieved by the closed-loop system; and the controller is reconfigured with each iteration of the setpoints; and when the predetermined level of performance of the engine and/or aftertreatment system is achieved, a multivariable control for setpoint determination is considered complete and a transfer to a next phase, such as certification, occurs.

19. The system of claim 16, wherein the performance variables comprise one or more items comprising specific fuel consumption and/or emissions.

20. The system of claim 19, wherein setpoints are changed according to the one or more changes recommended for the setpoints until the performance variables are deemed acceptable by a user or operator for normal operating conditions of the engine.

* * * * *